March 4, 1958     D. E. NILES     2,825,358
PRESSURE REGULATOR
Filed March 1, 1954
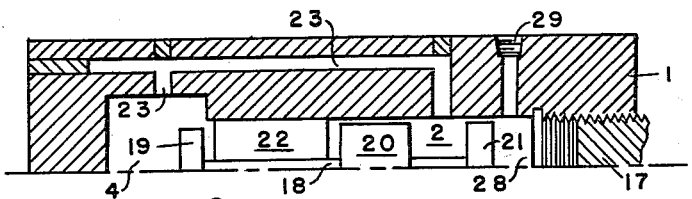
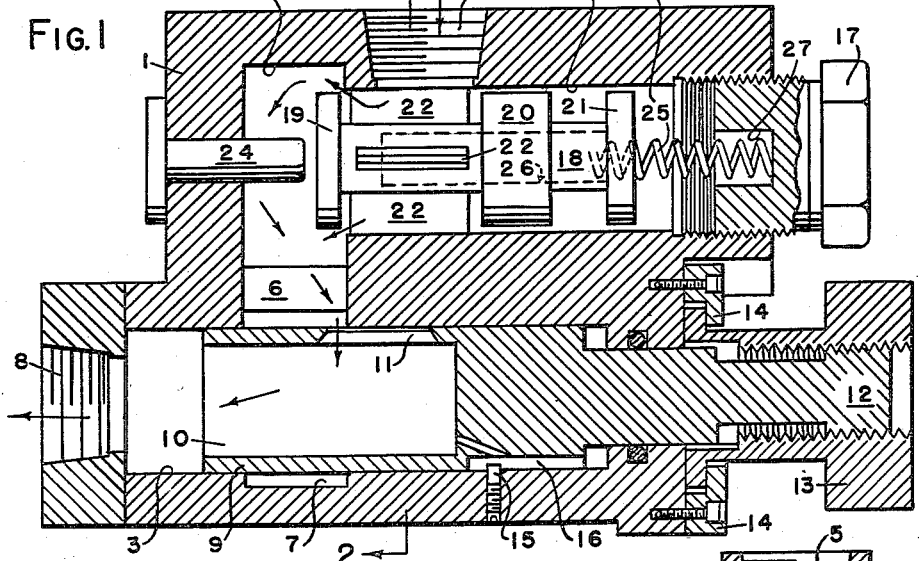
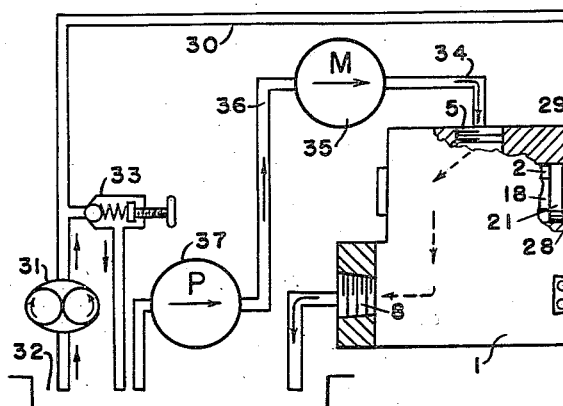
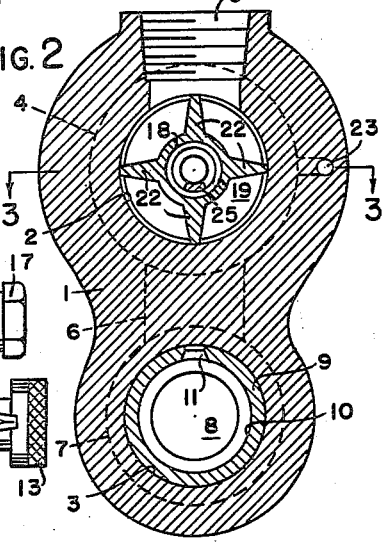
INVENTOR.
DONALD E. NILES
BY Wesley P. Merrill
ATTORNEY United States Patent Office 2,825,358
Patented Mar. 4, 1958

2,825,358

PRESSURE REGULATOR

Donald E. Niles, Waukesha County, Wis., assignor to The Oilgear Company, Milwaukee, Wis., a corporation of Wisconsin Application March 1, 1954, Serial No. 413,377

9 Claims. (Cl. 137—505.18)

This application is a continuation-in-part of abandoned application Serial No. 99,974, filed June 18, 1949.

The invention relates to pressure regulators of the type which includes a valve body having a bore, an inlet for connection to a source of pressure liquid, an outlet, a valve or plunger arranged in the bore to control communication between the inlet and the outlet, and means for urging the plunger in a direction to open communication between the inlet and the outlet. Such a regulator will not function unless the flow from the outlet is restricted to thereby cause creation at the outlet of a back pressure which urges the plunger in a direction to close communication between the inlet and the outlet.

The flow from the outlet may be restricted by connecting the outlet to the inlet of a hydraulic motor in which case the regulator would maintain a substantially constant pressure at the motor inlet and thereby enable the motor to exert a substantially constant torque if it were of the rotary type or to exert a substantially constant thrust if it were of the reciprocating type. But such a regulator is more commonly employed to maintain the pressure at the inlet of an orifice substantially constant to thereby enable the orifice to keep the flow in a circuit at a substantially constant rate, and the invention will be explained as being employed for that purpose but it is to be understood that embodiments of the invention may be employed for other purposes.

In the conventional regulators of the above type, the valve or plunger has pistons formed thereon and closely fitted in a bore formed in a valve body. Due to the close fit of the pistons, the plunger will not move until there is exerted thereon a force great enough to overcome the friction and inertia of the plunger and to also shear the films of liquid between the pistons and the wall of the bore. Consequently, the regulator is not entirely accurate in operation and it will not respond to small changes in pressure.

The present invention has its principal object to provide a pressure regulator which is much more accurate and precise in operation than the prior regulators and which will respond to very small changes in pressure.

That object is attained by making the pistons slightly smaller in diameter than the bore in the valve body, to thereby provide between the pistons and the wall of the bore films of such thickness that the molecules of liquid therein can readily change their relative positions, and by providing the plunger with axial ribs which are closely fitted in the bore and keep the pistons out of contact with the wall of the bore.

The invention is exemplified by the pressure regulator shown in the accompanying drawing in which the views are as follows:

Fig. 1 is a central longitudinal section through a pressure regulating valve in which the invention is embodied and through a throttle valve or flow resistor which cooperates with the pressure regulating valve to form a flow control.

Fig. 2 is a transverse section taken on the line 2—2 of Fig. 1.

Fig. 3 is a longitudinal section through a part of the pressure regulating valve, the plane of the view being indicated by the line 3—3 of Fig. 2.

Fig. 4 is a diagram illustrating a hydraulic circuit in which the flow control may be employed and showing the plunger of the pressure reducing valve urged toward its open position by hydraulic pressure instead of by a spring as in Fig. 1.

For the purpose of illustration, the flow control has been shown in Fig. 1 as being provided with a body 1 having formed therein two parallel bores 2 and 3, a counterbore 4 which communicates with one end of bore 2, an inlet port 5 which communicates with bore 2 adjacent to but spaced from counterbore 4, an outlet port 6 which connects counterbore 4 to an annular passage 7 formed in the wall of bore 3 and a discharge port 8 which communicates with bore 3 at one end thereof.

A control member 9 is fitted in bore 3 and has formed therein an axial passage 10, which extends into it from the end thereof adjacent to port 8, and at least one orifice 11 which extends through the wall of passage 10 and is adapted to register to a greater or lesser extent with passage 7.

The other end of control member 9 is provided with an extension 12 which extends through the end wall of bore 3 and is threaded to receive an adjusting nut 13 which is restrained from axial movement by the end of body 1 and by a pair of semi-circular retainer plates 14. Rotation of nut 13 will cause member 9 to move axially in bore 3 and thereby vary the effective area of orifice 11, rotation of member 9 being prevented by a key 15 which extends into a keyway 16 formed in member 9.

Bore 2 has the end thereof opposite counterbore 4 closed by a threaded plug 17 and it contains a valve plunger 18 having formed thereon three spaced apart pistons 19, 20 and 21 and a plurality of ribs 22 arranged between pistons 19 and 20, four ribs being shown. Ribs 22 have a close sliding fit in bore 2 but pistons 19, 20 and 21 are slightly smaller in diameter than bore 2. For example, if bore 2 is 1⅜" in diameter, pistons 19 and 20 may be .001" smaller in diameter than bore 2 and piston 21 may be .0007" smaller in diameter than bore 2. The arrangement is such that ribs 22 hold the pistons out of contact with the wall of the bore so that plunger 18 is almost frictionless but the clearances between the pistons and the wall of the bore are so small that the leakage past the pistons is negligible. Any liquid which leaks past piston 20 from inlet port 5 into the space between pistons 20 and 21 may flow therefrom into counterbore 4 through a suitable channel such as a passage 23 formed in body 1 as shown in Fig. 3.

Valve plunger 18 is adapted to be urged toward its closed position or toward the right in respect to Fig. 1 by pressure in counterbore 4 acting upon the left face of piston 19 and it is constantly urged in the opposite direction or toward its open position by a substantially constant force, movement of plunger 18 toward its open position being limited in any suitable manner such as by means of a stop 24.

Plunger 18 may be urged toward its open position by a spring or by a constant low pressure fluid acting upon the end face of piston 21. As shown in Fig. 1, it is urged toward the left by a spring 25 having the end portions thereof arranged within recesses 26 and 27 formed in plunger 18 and in plug 17 respectively, the ends of the spring bearing against the end walls of the two recesses. Any liquid leaking past piston 21 into the space 28 between piston 21 and plug 17 may escape through a passage 29 leading therefrom to the outside of body 1.

As shown in Fig. 4, space 28 constitutes a pressure chamber and passage 29 is connected by a channel 30 to a small pump 31 which draws liquid from a reservoir 32 and discharges it into channel 30. The liquid discharged by pump 31 in excess of requirements is exhausted through a relief valve 33 which enables pump 31 to maintain in chamber 28 a pressure which is equal to the resistance of relief valve 33 and which enables the liquid in chamber 28 to act upon piston 21 and to urge plunger 18 toward the left with a constant force proportional to that pressure.

It has previously been explained that the flow control is particularly adapted to control the speed of a motor by controlling the outflow therefrom and in Fig. 4 inlet port 5 has been shown connected by a channel 34 to the outlet of a motor 35 the inlet of which is connected by a channel 36 to the outlet of a pump 37 which draws liquid from reservoir 32 and delivers it to motor 35 to energize it. Such a circuit is provided with suitable controls which have been omitted from Fig. 4 to avoid complicating the view.

When there is no flow through the flow control, plunger 18 will be held in its fully open position by spring 25 or by fluid pressure in chamber 28. Then when motor 35 starts to operate, the liquid discharged therefrom will flow through channel 34, inlet port 5, bore 2, counterbore 4, outlet port 6, passage 7, orifice 11, passage 10, bore 3 and port 8 to exhaust.

Orifice 11 will resist the flow of liquid therethrough and thereby cause to be created in counterbore 4 a pressure which acts upon the left face of piston 19 and moves plunger 18 toward the right to cause piston 19 to throttle the flow into counterbore 4 and thereby reduce the pressure therein. Since plunger 19 is substantially frictionless, it will be moved toward the right until the pressure in counterbore 4 has been reduced to the desired value, such as 50 p. s. i., as determined by the adjustment of plug 17, which may be turned to regulate the tension of spring 25, or by the adjustment of relief valve 33 which controls the pressure in chamber 28.

Due to the very slight clearance between piston 20 and the wall of bore 2, there will be a slight leakage of liquid from inlet port 5 into the space between pistons 20 and 21 whence the leakage liquid can flow through passage 23 into counterbore 4 and the pressure in counterbore 4 will extend through passage 23 into the space between pistons 20 and 21. If plunger 18 is urged toward the left by a spring as shown in Fig. 1, chamber 28 is connected to exhaust but the drop in pressure across piston 21 is so low that the leakage into chamber 28 from the space between pistons 20 and 21 is negligible. If plunger 18 is urged toward the left by fluid pressure in chamber 28 as shown in Fig. 7, the pressures on opposite sides of piston 21 are substantially the same so that there is no leakage into chamber 28. Therefore, all of the liquid discharged by motor 35 is directed through orifice 11. It is also to be noted that, since pistons 19, 20 and 21 are substantially the same size, the pressures therebetween do not tend to move plunger 18 axially.

If the pressure at inlet port 5 should be increased such as by the load on motor 35 being reduced, the rate of flow into counterbore 4 would be increased momentarily but the resistance of orifice 11 to any increase in the flow therethrough would cause the pressure in counterbore 4 to rise and to move plunger 18 toward the right to further throttle the flow in counterbore 4 until the pressure therein was reduced to the value determined by the adjustment of plug 17 or by the adjustment of relief valve 33. If the pressure at inlet port 5 should be decreased such as by the load on motor 35 being increased, the rate of flow into counterbore 4 would be decreased momentarily and cause the pressure in counterbore 4 to drop and thereby permit spring 25 or the liquid in chamber 28 to move plunger 18 toward the left to reduce the resistance to the flow of liquid into counterbore 4 until the pressure therein was increased to the value determined by the adjustment of plug 17 or by the adjustment of relief valve 33. The pressure at orifice 11 is thus maintained substantially constant at any given adjustment of control member 9.

If when the flow control is functioning the effective area of orific 11 is increased by moving control member 9 axially to increase the length of orifice in registry with passage 7, the flow through orifice 11 will increase and cause the pressure in counterbore 4 to drop momentarily which will cause plunger 18 to move toward the left until the pressure in counterbore 4 is re-established at the value determined by the adjustment of plug 17 or by the adjustment of relief valve 33 as explained above. Conversely, if the effective area of orifice 11 is decreased, the flow through orifice 11 will decrease and cause the pressure in counterbore 4 to rise momentarily which will cause plunger 18 to move toward the right until the pressure in counterbore 4 is re-established at the value determined by the adjustment of plug 17 or by the adjustment of relief valve 33 as explained above. Thereafter, as long as the effective area of orifice 11 remains unchanged, the pressure at orifice 11 will remain substantially constant except for momentary variations due to variations in the pressure at inlet 5 as explained above.

The pressure regulator described herein is susceptible of other modifications and may be employed for other purposes without departing from the scope of the invention which is hereby claimed as follows:

What is claimed is:

1. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, said pistons being slightly smaller in diameter than said bore to thereby enable said ribs to keep said pistons out of contact with the wall of said bore, and means for exerting upon said plunger a substantially constant force which urges said plunger in a direction to open communication between said bore and said chamber.

2. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, a third piston arranged upon said plunger and spaced from said second piston, said pistons being slightly smaller in diameter than said bore to thereby enable said ribs to keep said pistons out of contact with the wall of said bore, channel means connecting said chamber to the space between said second and third pistons to conduct into said chamber liquid which leaks from said inlet port past said second piston into said space, and means for exerting upon said plunger a substantially constant force which urges said plunger in a direction to open communication between said bore and said chamber.

3. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, said pistons being slightly smaller in diameter than said bore to thereby enable said ribs to keep said pistons out of contact with the wall of said bore, a third piston arranged upon said plunger and spaced from said second piston, a channel connecting the portion of said bore adjacent said third piston to a low pressure region of the regulator, and a spring engaging the end of said bore for urging said plunger in a direction to open communication between said bore and said chamber.

4. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, a third piston arranged upon said plunger and spaced from said second piston, said pistons being slightly smaller in diameter than said bore to thereby enable said ribs to keep said pistons out of contact with the wall of said bore, channel means connecting said chamber to the space between said second and third pistons to conduct into said chamber liquid which leaks from said inlet port past said second piston into said space, a third piston arranged upon said plunger and spaced from said second piston, a channel connecting the portion of said bore adjacent said third piston to a low pressure region of the regulator, and a spring engaging the end of said bore for urging said plunger in a direction to open communication between said bore and said chamber.

5. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber, a second piston arranged upon said plunger at the other side of said inlet port, said pistons being slightly smaller in diameter than said bore to thereby enable said ribs to keep said pistons out of contact with the wall of said bore, and means for exerting upon said plunger a substantially constant force which urges said plunger in a direction to open communication between said bore and said chamber, the liquid in said chamber exerting upon said first piston a force which is proportional to the pressure in said chamber and which urges said plunger in a direction to close communication between said bore and said chamber so that said plunger is moved by the greater of said forces to regulate the opening between said bore and said chamber until the pressure in said chamber bears a predetermined ratio to said substantially constant force.

6. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber, a second piston arranged upon said plunger at the other side of said inlet port, a third piston arranged upon said plunger and spaced from said second piston, said pistons being slightly smaller in diameter than said bore to thereby enable said ribs to keep said pistons out of contact with the wall of said bore, channel means connecting said chamber to the space between said second and third pistons to conduct into said chamber liquid which leaks from said inlet port past said second piston into said space, and means for exerting upon said plunger a substantially constant force which urges said plunger in a direction to open communication between said bore and said chamber, the liquid in said chamber exerting upon said first piston a force which is proportional to the pressure in said chamber and which urges said plunger in a direction to close communication between said bore and said chamber so that said plunger is moved by the greater of said forces to regulate the opening between said bore and said chamber until the pressure in said chamber bears a predetermined ratio to said substantially constant force.

7. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, said pistons being slightly smaller in diameter than said bore to thereby enable said ribs to keep said pistons out of contact with the wall of said bore, means for exerting upon said plunger a substantially constant force which urges said plunger in a direction to open communication between said bore and said chamber, and a stop arranged in said chamber for preventing said constant force from moving said plunger beyond a given point.

8. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, a third piston arranged upon said plunger and spaced from said second piston, said pistons being slightly smaller in diameter than said bore to thereby enable said ribs to keep said pistons out of contact with the wall of said bore, channel means connecting said chamber to the space between said second and third pistons to conduct into said chamber liquid which leaks from said inlet port past said second piston into said space, a third piston arranged upon said plunger and spaced from said second piston, a channel connecting the portion of said bore adjacent said third piston to a low pressure region of the regulator, a spring engaging the end of said bore for urging said plunger in a direction to open communication between said bore and said chamber, and a stop arranged in said chamber for preventing said spring from moving said plunger beyond a given point.

9. A pressure regulator, comprising a valve body having an outlet for connection to a flow restrictor, a pressure chamber communicating with said outlet, an axial bore communicating with said chamber, and an inlet port communicating with said bore intermediate the ends thereof for the flow of pressure liquid thereinto, a plunger arranged in said bore and having a plurality of axial ribs arranged thereon and closely fitted in said bore to slidably support said plunger therein, a first piston arranged upon said plunger at one side of said inlet port to control communication between said bore and said chamber and subjected to the pressure in said chamber which urges said plunger in a direction to close communication between said bore and said chamber, a second piston arranged upon said plunger at the other side of said inlet port, a third piston arranged upon said plunger and spaced from said second piston, said pistons being slightly smaller in diameter than said bore to thereby enable said ribs to keep said pistons out of contact with the wall of said bore, channel means connecting said chamber to the space between said second and third pistons to conduct into said chamber liquid which leaks from said inlet port past said second piston into said space, and means for supplying to the space between said third piston and the end of said bore liquid at a substantially constant pressure which urges said plunger in a direction to open communication between said bore and said chamber.

References Cited in the file of this patent

UNITED STATES PATENTS

| | | |
|---|---|---|
| 219,114 | Ross | Sept. 2, 1879 |
| 1,467,522 | Amsler | Sept. 11, 1923 |
| 1,913,116 | Haimbaugh | June 6, 1933 |
| 2,272,684 | Vickers | Feb. 10, 1942 |
| 2,343,375 | Herman | Mar. 7, 1944 |

FOREIGN PATENTS

| | | |
|---|---|---|
| 5,277 | Great Britain | 1890 |